United States Patent Office 3,327,951
Patented June 27, 1967

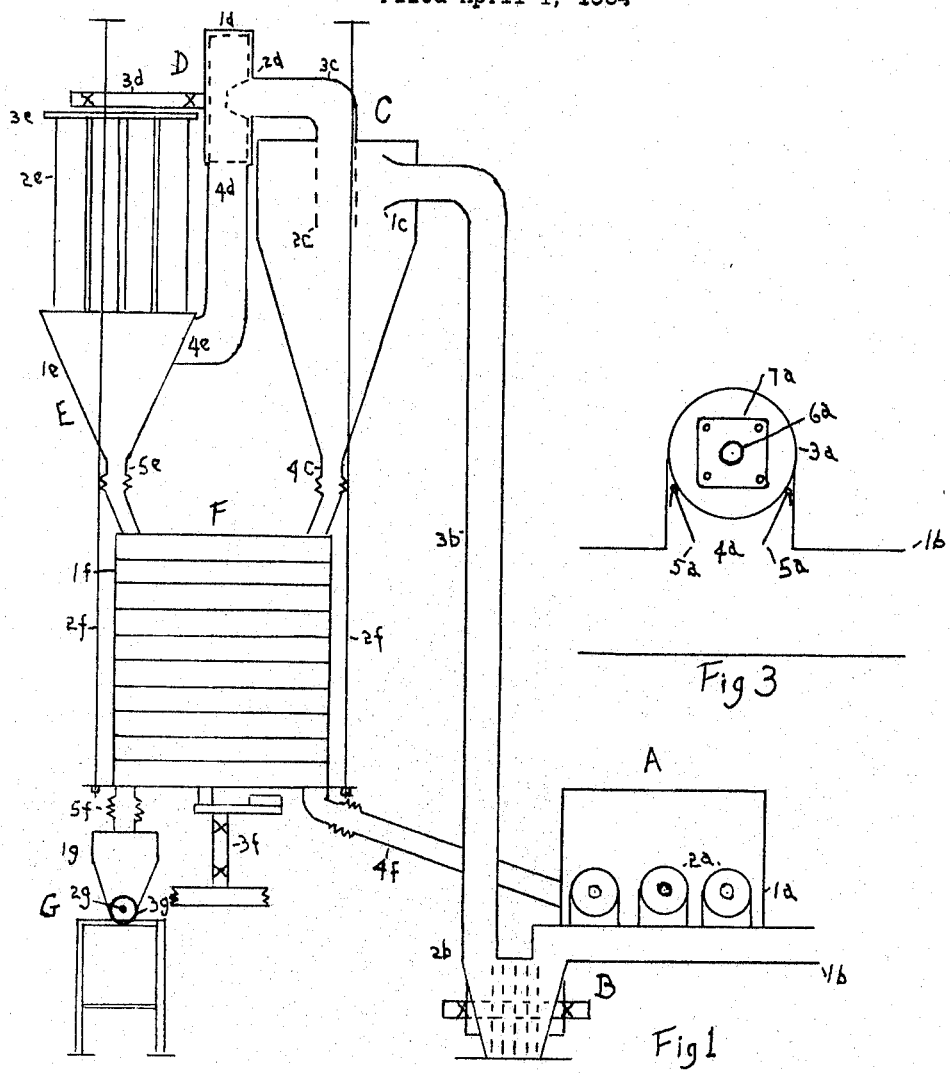
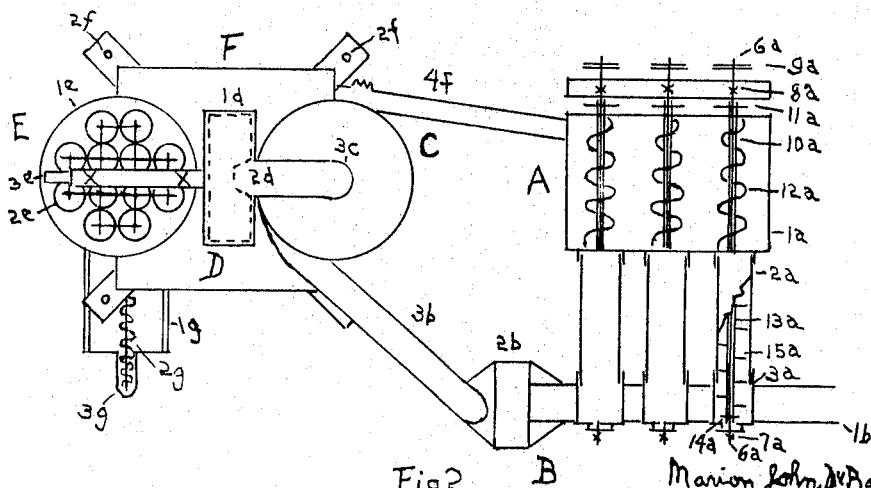

3,327,951
COMPLETE CONTINUOUS WET MICA GRINDING PROCESS
Marion John Du Bose, 27 Legal Bldg., Asheville, N.C. 28801
Filed Apr. 1, 1964, Ser. No. 356,476
12 Claims. (Cl. 241—4)

This invention relates to the new and simplified continuous pulverization process by which wet mica of varying size from mica house scrap down to tiny flakes can be ground, dried, sized and packaged in a few minutes, with no excess water or grinding losses and with numerous other advantages over the known art, as hereinafter described.

Mica booklike crystals have almost perfect basal cleavage which permits delamination into very thin sheets. Mica is a silicate containing aluminum and other metals. Muscovite is the principal commercial variety of mica.

Mica scrap from the preparation of sheet or pattern mica and mica crystals separated from kaolin, feldspar or granite are ground either wet or dry for numerous commercial purposes, depending upon the quality of the mica and the process used.

Dry grinding is done principally with hammermills which produce a rough hackled effect and reduce the mica to medium fineness of 20 to 100 mesh weighing about 18 pounds per cubic foot. This dry ground mica is used principally in the manufacture of composition roofing, drilling oil wells, etc. where extreme fineness, good color and high sheen are not important.

The best quality flake and scrap mica is wet ground to a fineness of 160 to 325 mesh by processes which give a smooth finish with high sheen, good color and bulk density less than 12 pounds per cubic foot. Wet ground mica is a high grade product used in the manufacture of paint, wall paper, rubber, plastics, welding rod, paper, textiles, etc. It is very different from dry ground mica and sells for several times as much per pound.

The time honored method of wet mica grinding is with muller mills about 10 feet in diameter and 3½ feet deep, into which a ton or more of dry scrap mica is placed and four large, heavy rollers are lowered onto the mica and about half a ton of water added, with more from time to time as needed; the rollers or mullers, which require 40 to 50 HP to rotate them at 30 to 40 r.p.m., and plows to turn the mica, are rolled continuously on it for eight hours or until the operator thinks the mica sufficiently ground; heat thus generated evaporates the water and damages the mica unless more water is added as needed; too much water interferes with the grinding action of the rollers.

Fine size mica, which constitutes the principal mica reserve, cannot be ground satisfactorily in muller mills because the rollers mire down in the mica, and especially in wet fine mica, and do not exert the necessary friction for delamination and comminution. After the alloted grinding time gates in the mill are opened and the mica flushed out with large quantities of clean water into troughs where the heavy unground mica settles and is shoveled back for regrinding. The fine water borne mica is screened to remove float trash and then goes to large settling tanks where it is allowed to stand for 24 hours or more to let what mica will settle to the bottom before the milky effluent carrying very fine mica, amounting to 10% to 20% of the mica ground, is discharged into streams or settling ponds. The thick slurry left is stirred and pumped to filter presses or centrifuges to reduce the water content to 30%–40%. This filter cake is dried in steam kettles or rotary dryer for 30 minutes to several hours and when dry goes to sifters for removal of oversize and classification of finished product into "160" and "325" mesh and bagged.

Some water is necessary in wet grinding of mica to produce the very minute particles with smooth lustrous sheen and light weight that make it a premium product. My complete continuous wet mica grinding process herein described produces the same quality and quantity of wet ground mica as batch process muller mills produce with a much simpler process requiring only a fraction as much space, time, machinery, water, power, heat or labor, and without mica grinding losses.

One of the objects of this invention is to devise a wet mica grinding process which uses the minimum amount of water necessary to produce a high grade product, but no excess water which requires a large water supply, costly machinery and expensive procedures to remove the water before the mica can be dried.

Another object of this invention is to eliminate grinding losses inherent with processes using excess water; these losses amount to 10% to 20% of the mica ground, greatly increasing the cost of scrap mica used and reducing the effective capacity of the grinding equipment.

Another object of this invention is to reduce the amount of labor and empirical skill required. Batch processes require much more labor than continuous processes, and with muller mills empirical skill is essential. My process is automatic from feed hopper to bag packer and no emperical skill is required.

Another object of this invention is to conserve power by the use of high speed light weight agitators that apply the power to the comminution of the mica under confining pressure and not waste power by the slow inefficient results effected by muller mills, filter presses, centrifuges and cumbersome drying methods.

Another object of this invention is to conserve and use the mechanical heat produced in grinding the mica in drying it. Other methods lose the heat generated in grinding by adding excess water after the actual grinding. In my process this step is not necessary nor desirable and is omitted, so that the hot thick mica slurry from my comminuter goes directly to the dryer thus saving time and heat in the drying process.

Another object of this invention is to reduce the time required for the complete grinding cycle. With muller mills this is two days or more. With my process it is less than thirty minutes!

Another object of this invention is to reduce the size, amount and cost of machinery and equipment necessary and the size and cost of building to house it. My process does all this by using high speed equipment and process and eliminating unnecessary steps, excess water, grinding losses, et cetera.

FIG. 1 of the drawing shows the front elevation view and FIG. 2 shows the plan view of the machines deemed best suited to perform the four basic steps in my complete continuous wet mica grinding process. FIG. 3 shows an enlarged view of part of one of these machines.

Comminuter A comprises hopper 1a with grinding cylinders 2a where the wet mica is pulverized under confining pressure by rapid agitation; dryer B consists of drying chamber 1b, where the wet ground mica and hot gases meet, deglomerator 2b where the fine mica particles are violently agitated in the hot gases, and stack pipe 3b where further drying occurs; cyclone collector C separates the solids from the gases, discharging the solids thru apex 4c into sifter F and the gases thru overflow pipe 3c to exhaust fan D, which draws the gases and mica thru the dryer and cyclone and discharges the gases into air filter E which removes the ultra fine particles of mica, not removed by cyclone C, and discharges them into sifter F, which classifies all the mica into: (1) oversize, which is reground; and (2) fines, which are classified as "160," or "325" depending upon the final mesh size; the fines go to bag packer G which bags them for market.

FIG. 2 also shows details of comminuter A not shown in FIG. 1. FIG. 3 shows an enlarged view of cylinder head 3a and discharge port 4a, parts of comminuter A.

My complete continuous wet mica grinding process consists of four basic steps, to-wit: (1) the comminution of wet mica by rapid agitation under confining pressure causing heat, delamination, shearing and attrition of the mica to minute platy particles; (2) drying and deglomeration or separation of these fine mica flakes; (3) classification or sizing of the mica into oversize to be reground and finished products to be (4) bagged according to mesh size.

The machines described herein are considered the best means of performing these steps, but other machines may be used to accomplish the same results. My process is not limited to the use of any particular machines, but is based on the invention or discovery thru experimentation of the fact that high grade wet ground mica can be produced rapidly and economically by the four steps described above.

Comminuter A is a battery type machine consisting of metal hopper 1a with plurality of parallel grinding cylinders 2a attached perpendicularly to the hopper along one side near the bottom. The cylinder head 3a, FIG. 3, has discharge port 4a in its underside, with hinged, spring loaded port gates 5a to regulate the discharge of the hot mica slurry from the grinding cylinder 2a into the drying chamber 1b, and maintain the desired confining pressure in the cylinder for most efficient grinding.

Shaft 6a extends from flange bearing 7a, mounted with clearance on the end of cylinder head 3a, concentrically thru the cylinder head and cylinder 2a, across the bottom of hopper 1a, thru an opening in the rear wall of the hopper and thru pillow block bearing 8a mounted on a pedestal several inches from the hopper. Double groove V-pulley 9a is mounted on shaft 6a out side of bearing 8a and rotates the shaft from an external power source.

Tube 10a is mounted concentrically over shaft 6a with bearings between shaft and tube so that they can rotate independently; tube 10a extends from bearing 8a thru the rear wall of hopper 1a, across the bottom of the hopper and a short distance into cylinder 2a; sprocket 11a is mounted on tube 10a, between the hopper and bearing 8a, and is rotated by variable speed drive; short pitch tapered flight feeder screw 12a is mounted around and welded to tube 10a, with the large end fitted a short distance into cylinder 2a and the small end just clearing the rear wall of hopper 1a.

Pipe 13a fits snugly over shaft 6a and extends from the end of feeder screw 12a thru cylinder 2a and cylinder head 3a and is fastened to shaft 6a by thru pin 14a so that the pipe rotates with the shaft. A plurality of agitator blades 15a, just long enough to clear the inside of cylinder 2a, are welded radially, in a short pitch spiral, around and to pipe 13a, and exert a conveying as well as comminuting effect on the mica as they are rotated.

The bearings, shaft, screw, agitator, drives, cylinder and head described above are similar, replaceable and interchangeable, and rotating parts may be driven together, separately or alternately. And by using partitions in the hopper a whole grinding section, or part of it, may be repaired or replaced without interfering with the operation of the other units.

Dryer B comprises drying chamber 1b into which hot gases, or heated air at about 300 deg. F. to about 1200 deg. F. from an external source, are introduced and mixed with the hot thick mica slurry discharged from port 4a in cylinder head 3a; the mica and hot gases are drawn into deglomerator 2b, which is a grateless hammer mill that violently agitates the ground mica in the hot gases as they pass thru it to stack pipe 3b, where further drying takes place. This hammer mill consists of a circular chamber with inlet and outlet ports near the top on either side, with horizontal shaft, mounted on out board bearings, passing thru the chamber in which free swing hammers, attached to the shaft, are rotated at high speed causing violent turbulence of the gases and entrained solids as they pass thru the mill.

Hammer mills are extensively used in industry, and described in Catalog #87, Raymond Division, Combustion Engineering, Inc., 427 West Randolph St., Chicago 6, Ill., and in numerous other publications.

Cyclone C is a cylinder-cone with inlet 1c connected to stack pipe 3b; vortex finder 2c, inside the cone, is connected by over flow pipe 3c to the inlet port 2d of fan D; apex or under flow port 4c is connected by flexible coupling to sifter F. The mica laden gases enter the cyclone tangentially at high velocity and swirl around inside the cone, and the solid particles settle out to the bottom or apex where they are discharged thru a suitable valve into sifter F. The gases discharge thru the vortex and overflow pipe to exhaust fan D.

Cyclones are extensively used in separating solids from gases and as collectors, and are fully described in Bulletin D-20, The Day Company, 810 Third Ave. NE., Minneapolis 13, Minn. and in numerous other publications.

Fan D comprises housing 1d in which a radial blade impeller, attached to the end of bearing mounted power driven shaft 3d, is rotated at high speed, expelling air at periphery discharge port 4d and drawing in air at center intake port 2d, from cyclone C.

This type fan is made by numerous companies and is fully described in Catalog 1151 by Westinghouse Electric Corp., Sturtevant Division, Hyde Park, Boston 36, Mass.

Air filter E, called a "bag collector" is composed of cone shaped covered hopper 1e with a plurality of parallel, perpendicular cloth bags 2e with their bottom open ends attached to openings in the hopper deck and their closed top ends attached to shaker frame 3e; and discharge port 5e, with air lock valve, connected by flexible joint to sifter F; and inlet port 4e connected to fan exhaust 4d.

The air or gases from fan D, carrying very fine particles of mica not collected by cyclone C, enter the air filter thru inlet 4e and are filtered by bags 2e which permit the gases to go thru and retain the mica. Periodically when the pressure from the fan is shut off the bags are shaken by frame 3e and the mica falls into the hopper 1e and is discharged thru 5e to sifter F. Two air filters may be used alternately, or the discharge from the fan vented momently into the air while the bags are shaken, if it is not desirable to wait until the fan is stopped.

Air filters of this sort are extensively used, and fully described in Bulletin #805R1 by Draco Division, The Fuller Company, 4063 E. 116th St., Cleveland 5, Ohio.

Multideck low head sifter F comprises a plurality of screen decks 1f, superimposed on each other, fastened together, with or without enclosing box, and supported or suspended by flexible, 2f, rods from superstructure, and gyrated by motor driven, counter balanced eccentric drive 3f. Each deck has classifying screen cloth attached, with cleaner balls or knockers to keep the screens from blinding, pans to catch the fines and passages for the separated sizes of mica; all so arranged that the feed passes successively over a plurality of screen cloths to produce the several different mesh size products desired. The unsized ground and dried mica enters thru ports in the top of the sifter (4c and 5e). The oversize is scalped off and returned thru pipe 4f to hopper 1a of comminuter A to be reground with new feed; the fines, usually "160 mesh," or "325 mesh," depending upon customer's specifications and mesh size used, are discharged thru pipe 5f to bag packer G.

This type multideck low head sifter is extensively used for the sizing or classification of fine materials and is fully described in Bulletin 06x6903A entitled Low Head Gyratory Sifters, by Allis-Chalmers Mfg. Co., Milwaukee 1, Wis., and in Bulletin 135B entitled Gyro-Whip Sifters, by Sprout-Waldron Co., Muncy, Pa.

Bag packer G is composed of V-bottom hopper 1g with motor driven feeder screw 2g extending across the bottom of the hopper and into discharge spout 3g which is inserted into the valve opening of the multiwall paper bags; the fine mica is forced from the hopper 1g thru the spout 3g and into the bags by rotation of feeder screw 2g.

These bag packers are well known and fully described in Brochure M5BP–5M1260, by H. L. Stocker Co., 111 S. College Ave., Claremont, Calif.

This complete continuous wet mica grinding process I have invented consists of introducing clean sheet or flake mica, wetted with from 10% to 40% water by weight, into hopper 1a of comminuter A, rotating feeder screw 12a at about 20 to 80 r.p.m. so as to force the non-fluid wet mica into cylinder 2a under pressure of 1 to 20 lbs./sq. inch, rotating agiator 15a at a speed of about 500 to 2500 r.p.m., thereby delaminating and shearing the mica into minute platy particles and mechanically heating the mica slurry, to a temperature between about 100° F. and 210° F., and discharging this hot mica slurry from port 4a by the conveyor action of agitator blades 15a and by the pressure of the new feed as it is forced into cylinder 2a by feeder screw 12a from hopper 1a.

The confining pressure which is essential to this grinding process can be varied by changing the speed of feeder screw 12a and adjusting the spring tension on discharge port gates 5a. The friction produced and the power consumed by the rotation of agitator blades 15a in the compressed wet mica and the resulting work done and heat generated can be varied by changing the speed of rotation of agitator 15a or the percent of water added to the mica, or the spring tension on discharge port gates 5a.

The mechanically pulverized and heated mica slurry discharged from port 4a of comminuter A goes directly by gravity to drying chamber 1b where it mixes with and is carried by the hot gases, introduced from outside source, into grateless hammermill 2b where the ground mica and hot gases are violently agitated as they pass thru the free swinging, rapidly rotating hammers of the mill and are then drawn up thru stack pipe 3b to cyclone C. This intimate mixing of the wet ground mica and hot gases rapidly evaporates the water and deglomerates or frees the mica particles from each other and promotes subsequent sizing or classification.

The ground, dried, deglomerated mica, carried by the hot gases, enters cyclone C through inlet port 1c, tangentially, and swirls inside the cone, thereby creating centrifugal force that carries the solid mica particles to the periphery where they settle down the cone wall to apex 4c and are discharged thru flap air valve into the top deck of sifter F. The gases, with 2–3% of very fine mica, go out the vortex finder 2c and into fan D thru inlet port 2d.

Fan D creates the negative pressure, called suction, that draws the hot gases and ground mica thru drying chamber 1b, grateless hammermill 2b, stack pipe 3b and cyclone C. As the gases pass thru the fan the pressure changes from negative to positive, and the gases, with the very fine mica particles, which enter the fan at inlet port 2d under negative pressure are discharged under positive pressure from port 4d, and enter metal cone 1e of air filter E thru inlet port 4e.

The gases and very fine mica pass up from cone 1e into the cloth filter bags 2e, the lower open ends of which are attached to openings in the deck of cone 1e. The top closed ends of bags 2e are attached to and supported by shaker frame 3e, which in turn is suspended by a shaking device. The gases and fine mica enter the open ends of the bags 2e and the gases pass thru the cloth walls of the bags but the fine mica is retained on the insides of the bags and forms a layer of fine mica particles held in place by the force of the gases passing thru it and the filter cloth bag wall. Periodically this pressure is stopped, either by stopping the fan, venting its discharge momently into the outside air, or using two airfilters alternately.

The fine mica from air filter E is discharged thru air lock and discharge port 5e to the top deck of multideck sifter F where it mixes with the mica from cyclone C, and all the mica is sized or classified together in sifter F. Sifter decks are covered with 100 or 200 mesh screen cloth. Due to the pitch of the screen cloths and the gyration of the sifter the mica feed passes successively over the screens until the fines go thru and are caught by the pans and discharged thru passages designed for that purpose. Several different size products may be delivered simultaneously thru separate ports in the bottom of the sifter.

The plus 100 mesh oversize returns thru pipe 4f to hopper 1a of comminuter A to mix with new feed for further grinding. The minus 100 or 200 mesh fines go thru pipe 5f to bag packer G; bags are labeled "160 mesh"; or "325 mesh" according to contents.

The bag packer G is designed for use with multiwall paper bags with tuck in sleeve valves, holding 50 pounds each of wet ground mica. The bag valve is slipped over delivery spout 3g and motor driven feeder screw 2g rotated until the bag is filled with mica. The bag is then removed, weight checked and adjusted, if necessary, and sleeve tucked in valve to prevent any mica spilling. Bags are numbered, labeled and stacked on pallets, according to contents, ready for market.

The particular structure and arrangement shown in the drawings and described in this specification is illustrative only and not to be considered as limiting. Many variations of the particular structure shown may be made without departing from the scope of this invention.

For example the comminuter described is a battery type machine with a plurality of grinding cylinders and components which may be operated simultaneously or alternatively. But a one cylinder machine could be used and the wet mica forced into the disintegration zone by various methods other than by feeder screw as described. An entirely different method of drying, deglomerating and conveying could be used. Rotary steam dryers with knockers, dust collectors, bucket elevators and screw or drag conveyors would do. Different type screens, such as electrically vibrated decks or trummel screens could be used. Open mouth bag packers, or other type packaging could be used. Any or all of these substitutions, or others, while not as efficient nor desirable as the machines and methods above described, would come within the scope of my process, which is not limited to any particular machines or arrangement of machines.

*Example*

Accepted trade standards in the wet ground mica industry are: (1) high sheen, (2) slick ungent feel or slip, (3) good color, better than 65% compared to standard magnesium oxide measured thru a green filter on a Photoelectric Reflection Meter #605, by Photovolt Corp., New York, (4) bulk weight of less than 12 pounds per cubic foot as measured on a Scott Volumeter, by E. H. Sargent Co., Chicago, and (5) particle size, usually minus 100 mesh is called "160 mesh" and minus 200 mesh is called "325 mesh."

Mica ground by my complete continuous wet mica grinding process has high sheen, slick feel or slip, good color, light bulk weight and fine particle size.

Four samples of different types of micas having different flake size, characteristics and color were ground by my complete continuous wet mica grinding process with the following results:

| No | Flake mica sample | | Water added, percent | Grinding | | Percent ground at one pass | | Color/MgO green filter, percent | Lbs./cu. ft. SVM' ter |
|---|---|---|---|---|---|---|---|---|---|
| | Color | Size | | Min. | P.s.i. | −100 M | −200 M | | |
| 1 | Green | 3" x 4" | 30 | 5 | 2 | 74 | 58 | 68.5 | 9.6 |
| 2 | Ruby | 2" x 3" | 25 | 10 | 5 | 71 | 53.5 | 78.0 | 10.9 |
| 3 | Clear | 2 Mesh | 25 | 5 | 3 | 71 | 61 | 71 | 11.7 |
| 4 | White | 6 Mesh | 33 | 5 | 5 | 59 | 43 | 73 | 10.9 |

Having described my invention and explained its operation and advantages over the prior art in wet mica grinding, I claim:

1. A complete continuous wet mica grinding process comprising adding water to mica to produce a mixture containing from about 10% to about 40% water and about 90% to about 60% mica, by weight; continuously forcing this nonfluid wet mica into a confining area under maintained pressure of about 1 p.s.i.g. to about 20 p.s.i.g.; strongly agitating this compressed wet mica, thereby producing friction and generating heat, and delaminating and shearing the mica into minute platy particles; withdrawing this hot wet ground mica at a controlled rate so as to retain the mica in the agitation zone for about 1 minute to about 10 minutes, and maintaining the temperature of the wet mica therein between about 100 deg. F. and 210 deg. F.; discharging this hot mica slurry directly into hot gases and strongly agitating the mica in the hot gases for about 3 seconds to about 30 minutes, thereby evaporating the water, drying the mica and separating the mica particles from each other; separating the ground dried mica into two fractions, a coarse fraction which is recycled and a fine fraction of the desired particle size; and packaging this fine mica for market.

2. A complete process for continuous wet mica grinding as described in claim 1 where the fine mica has a bulk density of not more than 12 pounds per cubic foot as measured on a Scott Volumeter and color value better than 65% as compared to standard magnesium oxide when measured thru a green filter on a Photovolt reflection meter.

3. A complete continuous wet mica grinding process as described in claim 1 where the fine mica is classified by different screen mesh sizes into minus 100 mesh called "160 mesh," and into minus 200 mesh called "325 mesh."

4. A complete continuous wet mica grinding process comprising adding water to mica to produce a mixture containing, by weight, from about 10% water and 90% mica to about 40% water and 60% mica; continuously forcing this nonfluid wet mica under sustained pressure of about 1 p.s.i.g. to about 20 p.s.i.g. thru a cylindrical chamber; continuously agitating the compressed wet mica over the full length of the cylinder and retaining the mica in the cylinder for about 1 minute to about 20 minutes, thereby producing friction and generating heat and delaminating and shearing the mica into minute platy flakes; having a pressure regulating device on the discharge port of the grinding chamber whereby the optimum pressure for grinding can be maintained; keeping the temperature of the wet mica in the cylinder as it is being ground between about 100 deg. F. and about 210 deg. F.; discharging the hot wet ground mica from the grinding chamber at a controlled rate directly into hot gases in a drying chamber and strongly agitating the mica in the hot gases for about 3 seconds to about 30 minutes thereby evaporating the water, drying the mica and separating the mica particles from each other; separating the dried ground mica into two fractions, a coarse fraction to be recycled and a fine fraction, sized according to market demands, which is packaged for handling.

5. A complete process for continuous wet mica grinding as described in claim 4 where the fine mica has a bulk density of not more than 12 pounds per cubic foot as measured on a Scott Volumeter and color value better than 65% as compared to standard magnesium oxide when measured thru a green filter on a Photovolt reflection meter.

6. A complete continuous wet mica grinding process as described in claim 4 where the fine mica is classified by different screen mesh sizes into minus 100 mesh called "160 mesh," and into minus 200 mesh called "325 mesh."

7. A complete continuous wet mica grinding process comprising adding water to mica to produce a mixture containing from about 10% water and 90% mica to about 40% water and 60% mica by weight; continuously forcing this nonfluid wet mica under sustained pressure of about 1 p.s.i.g. to about 20 p.s.i.g. thru a cylindrical chamber; strongly agitating the compressed wet mica throughout the length of the compression-grinding chamber thereby producing friction and generating heat and delaminating and shearing the mica into minute platy particles; having a pressure regulating device on the discharge port of the grinding chamber whereby the optimum pressure for grinding is maintained; discharging the hot wet ground mica from the grinding chamber at a controlled rate so as to retain the mica in the grinding chamber under strong agitation for about 1 minute to about 20 minutes and keeping the maximum temperature of the wet mica in the grinding chamber between about 100 deg. F. and about 210 deg. F.; discharging the hot wet ground mica from the grinding chamber directly into hot gases at from about 300 deg. F. to about 1200 deg. F. and strongly agitating the mica and hot gases in a drying chamber for about 3 seconds to about 30 minutes, thereby evaporating the water, drying the mica and separating the mica particles from each other; forcing the mica laden gases thru a cyclone, air filter, thereby removing the mica particles from the gases, collecting the mica and venting the moisture bearing gases into the atmosphere; separating the ground, dried mica into two fractions or products, the coarse fraction to be recycled and the fine product, sized according to trade standards or customers' specifications, packaged or bagged for market.

8. A complete continuous wet mica grinding process as described in claim 7 where the fine mica product has a bulk density of not more than 12 pounds per cubic foot as measured on a Scott Volumeter and color value better than 65% as compared to standard magnesium oxide when measured thru a green filter on a Photovolt reflection meter.

9. A complete continuous wet mica grinding process as described in claim 7 where the fine mica product is classified by different screen mesh sizes into minus 100 mesh called "160 mesh" and into minus 200 mesh called "325 mesh."

10. A complete continuous wet mica grinding process comprising adding water to mica to produce a mixture containing from about 10% water and 90% mica to about 40% water and 60% mica by weight; continuously forcing this nonfluid wet mica under sustained pressure of about 1 p.s.i.g. to about 20 p.s.i.g. thru a cylindrical chamber; strongly agitating the compressed wet mica throughout the length of the compression-grinding chamber thereby producing friction and generating heat and delaminating and shearing the mica into minute platy particles; having a pressure regulating device on the discharge port of the grinding chamber whereby the optimum pressure for grinding is maintained; discharging the hot wet ground mica from the grinding chamber at a controlled rate so as to retain the mica in the grinding chamber under strong agitation for about 1 minute to about 20 minutes and keeping the maximum temperature of the wet mica in the grinding chamber between about 100 deg. F. and about 210 deg. F.; discharging the hot wet ground mica from the grinding chamber directly into hot gases at from about 300 deg. F. to about 1200 deg. F. and strongly agitating the mica and hot gases in a drying chamber for about 3 seconds to about 30 minutes thereby evaporating the water, drying the mica and separating the mica particles from each other; forcing the mica laden gases thru a cyclone, air filter, thereby removing the mica particles from the gases; collecting the mica and venting the moisture bearing gases into the atmosphere; separating the dried ground mica by screening or sifting into two fractions, to-wit: a coarse fraction to be recycled for further grinding with new feed, and a fine fraction which is sized according to trade standards or customers' specifications; discharging the fine mica fraction into the hopper of a bag packer from whence the desired unit amount of the fine mica product is forced by screw feeder, or other device, into multiwall paper bags, or other containers, which are manually removed from the bagger, closed dust tight, marked or labeled and stacked on pallets ready for market.

11. A complete continuous wet mica grinding process as described in claim 10 where the fine mica product has a bulk density of not more than 12 pounds per cubic foot as measured on a Scott Volumeter and color value better than 65% as compared to standard magnesium oxide when measured thru a green filter on a Photovolt reflection meter.

12. A complete continuous wet mica grinding process as described in claim 10 where the fine mica product is classified by different screen mesh sizes into minus 100 mesh called "160 mesh" and into minus 200 mesh called "325 mesh."

References Cited
UNITED STATES PATENTS

| | | | |
|---|---|---|---|
| 1,716,758 | 6/1929 | Bland | 241—4 X |
| 2,157,775 | 5/1939 | Smith | 34—57 X |
| 2,187,538 | 1/1940 | Butler. | |
| 2,341,340 | 2/1944 | Sternfield | 53—21 |
| 2,378,920 | 6/1945 | Gillican | 53—25 |
| 2,547,336 | 4/1951 | McDaniel | 241—4 |

ROBERT C. RIORDON, *Primary Examiner.*

D. G. KELLY, *Assistant Examiner.*